United States Patent [19]

Sano

[11] Patent Number: 4,914,594
[45] Date of Patent: Apr. 3, 1990

[54] DETECTOR FOR DETECTING SELECTOR POSITION OF AUTOMATIC TRANSMISSION

[75] Inventor: Kunihiko Sano, Fuji, Japan

[73] Assignee: Japan Automatic Transmission Co., Ltd., Fuji, Japan

[21] Appl. No.: 154,839

[22] Filed: Feb. 11, 1988

[30] Foreign Application Priority Data

Feb. 12, 1987 [JP] Japan .......................... 62-017825[U]
Jul. 27, 1987 [JP] Japan ................................ 62-185440

[51] Int. Cl.$^4$ ........................ B60K 23/02; G05G 9/00
[52] U.S. Cl. .................................. 364/424.1; 340/456; 74/473 R
[58] Field of Search .................. 364/424.1; 74/473 R, 74/475, 866; 340/456

[56] References Cited

U.S. PATENT DOCUMENTS

| | | | |
|---|---|---|---|
| 4,493,228 | 1/1985 | Vukovich et al. .................... | 74/866 |
| 4,513,276 | 4/1985 | Kubota et al. ..................... | 74/473 R |
| 4,598,374 | 7/1986 | Klatt ................................. | 364/424.1 |
| 4,610,179 | 9/1986 | Parker .............................. | 74/473 R |
| 4,627,312 | 12/1986 | Fujieda et al. .................... | 364/424.1 |
| 4,699,239 | 10/1987 | Ishino et al. ..................... | 364/424.1 |

FOREIGN PATENT DOCUMENTS 61-266853 11/1986 Japan .............................. 74/473 R Primary Examiner—Felix D. Gruber
Attorney, Agent, or Firm—Foley & Lardner, Schwartz, Jeffery, Schwaab, Mack, Blumenthal & Evans

[57] ABSTRACT

A selector position detector arrangement for an automotive automatic transmission includes a detector producing a level signal variable of the level depending upon the selector level position. The level signal is converted into digital signal having a value corresponding to the level of the level signal. The digital signal value is compared with present reference values corresponding to the transmission selector positions.

16 Claims, 8 Drawing Sheets

DETECTOR FOR DETECTING SELECTOR POSITION OF AUTOMATIC TRANSMISSION

BACKGROUND OF THE INVENTION

1. Field of the Invention

The present invention relates generally to a detector for detecting selector position of an automatic transmission. The invention relates to an automatic transmission selector position detector which can accurately detect the selector position and compensate error in production or secular variation, which causes variation of selector positions relative to the transmission control position to be selected.

2. Description of the Background Art

The Japanese Utility Model First (unexamined) Publication (Jikkai) Showa 57-94531 discloses a selector position detector for an automotive transmission. The selector position detector as disclosed, is provided with a plurality of stationary terminals respectively corresponding to selector positions at respective automatic transmission control positions. The detector also has a movable arm associated with a selector lever to be shifted with the latter. The movable arm carries a plurality of electrodes to contact with a pair of stationary terminals for generating a selector position indicative signals.

Such selector position detector is adapted to detect a specific type of transmission and cannot be applied to different type of transmissions. Namely, when the selector position detector is applied for detecting selector position of the automotive transmission shiftable between park position (P position), reverse gear position (R position), neutral position (N position), drive position (D position), second gear position (2 position) and low gear position (1 position), the same detector cannot be applied for detecting selector position of the transmission which has an over-drive gear position (O/D position). Furthermore, such type of selector position detector is required to position the stationary terminals at positions accurately corresponding to the selector positions of respective transmission gear positions.

Similar type of selector position detectors are also disclosed in the Japanese Patent First Publication (Tokkai) Showa 57-134331, corresponding to U.S. Pat. No. 4,513,276, the Japanese Utility Model First Publication (Jikkai) Showa 59-193733, the Japanese Utility Model First Publication (Jikkai) Showa 59-146222, the Japanese Patent First Publication (Tokkai) Showa 59-26331.

SUMMARY OF THE INVENTION

In view of the drawback or inconvenience in the conventional selector position detectors, it is an object of the present invention to provide an automotive transmission selector position detector which detects a selector position in digital manner.

Another object of the invention is to provide a selector position detector which can compensate error caused in assembling of the transmission and/or in secular variation and thus assure detection of the transmission gear position corresponding to the selector position.

In order to accomplish the aforementioned and other objects, a selector position detector arrangement for an automotive automatic transmission, according to the invention, includes a detector producing a level signal variable of the level depending upon the selector lever position. The level signal is converted into digital signal having a value corresponding to the level of the level signal. The digital signal value is compared with preset reference values corresponding to the transmission selector positions.

With the foregoing construction, the detector arrangement can be applied for any number of shift positions of transmissions simply by changing the reference values.

According to one aspect of the invention, a selector position detector arrangement for an automotive automatic transmission comprises a detector means mechanically associated with a selector lever of the automatic transmission for producing a variable level signal representative of the shift position of the selector lever, a converter circuit receiving the level signal and converting the received level signal into a digital signal having a value variable depending upon the level of the level signal, and a discriminator means deriving a selector position discriminating data on the basis of the digital signal, comparing the discriminating data with a plurality of reference values which is set to represent respective selector position for discriminating the selector position and producing a selector position indicative signal.

In the preferred construction, the detector means comprises a movable member movable according to shift position of the selector lever, a first and second electrodes, and conductive member carried by the movable member and bridging between the first and second electrodes, the first electrode being connected to a constant level source at one end and to the ground at the other end, the second electrode having an output terminal at one end, the impedance of the first and second electrodes being so selected to as to linearly vary the level according to the selector position.

According to another aspect of the invention, a selector position detector arrangement for an automotive automatic transmission comprises a detector means mechanically associated with a selector lever of the automatic transmission for producing a variable level signal representative of the shift position of the selector lever, a converter circuit receiving the level signal and converting received level signal into a digital signal having a value variable depending upon the level of the level signal, a correction value deriving means responsive to engine start-up for deriving a correction value on the basis of the digital signal at engine start-up and a preset value corresponding to parking position and neutral position, a discriminator means deriving a selector position discriminating data on the basis of the digital signal and the correction value, comparing the discriminating data with a plurality of reference values which is set to represent respective selector position for discriminating the selector position and producing a selector position indicative signal.

Preferably, the correction value derivation means discriminates transmission selector position between the parking position and neutral position and deriving a difference between the digital signal and the preset value as the correction value, and the discriminator means derives the discriminating data on the basis of the digital signal value and the correction value. Furthermore, it is preferable to provide a correction value limiting means for limiting the correction value within a predetermined value range. The limiting means limits the correction value at upper or a lower limit of the predetermined value range.

According to a further aspect of the invention, a selector position detector arrangement for an automotive automatic transmission comprises a detector means mechanically associated with a selector lever of the automatic transmission for producing a variable level signal representative of the select position of the selector lever, a converter circuit receiving the level signal and converting received level signal into a digital signal having a value variable depending upon the level of the level signal, an initial value setting means responsive to engine start-up for setting a digital value at engine start-up as an initial value, and the discriminator means calculates a difference between instantaneous digital signal value and the initial value so as to discriminate the selector position based on the difference, and a discriminator means deriving a selector position discriminating data on the basis of the digital signal and the initial value, comparing the discriminating data with a plurality of reference values which is set to represent respective selector position for discriminating the selector position and producing a selector position indicative signal.

The discriminator means discriminate selector position upon engine start-up between parking position and nuetral position, and select reference values to be compared with the difference value corresponding to the selector position upon engine start-up.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
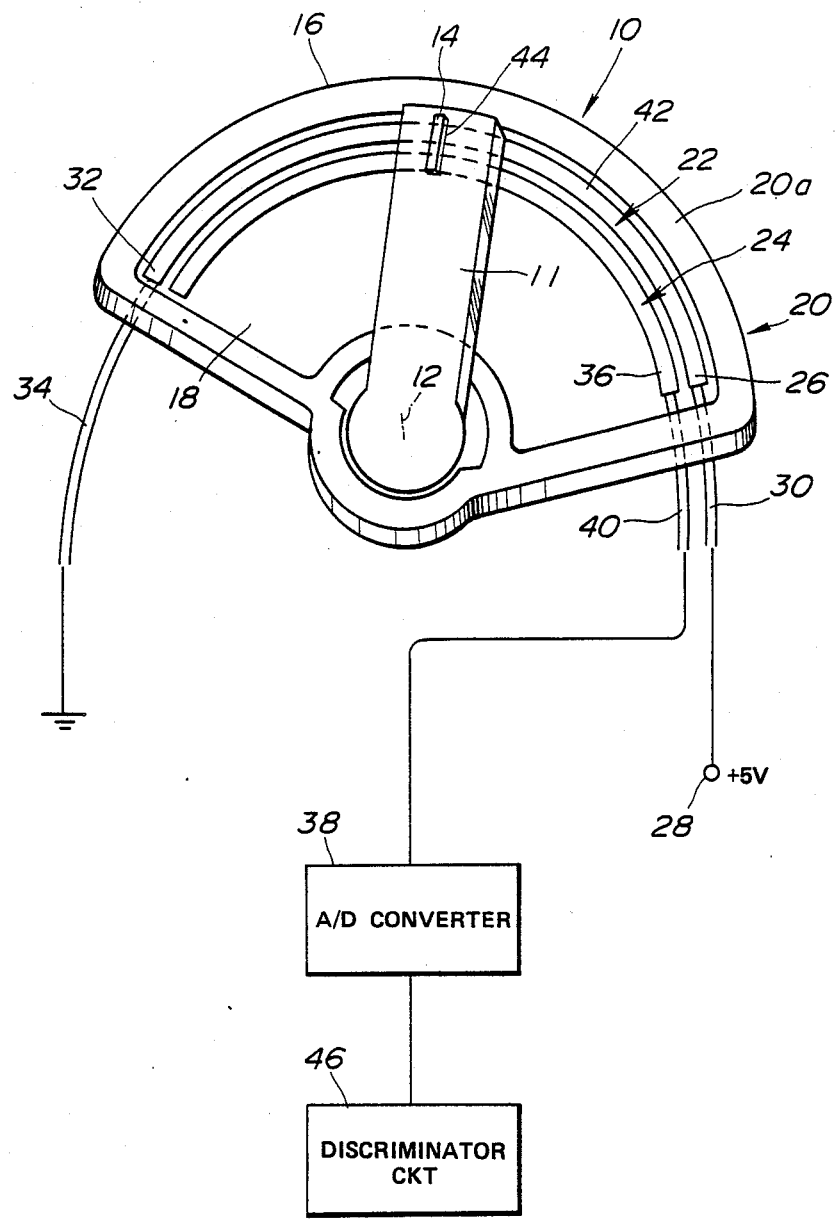
FIG. 1 is a fragmentary illustration of the first embodiment of a selector position detector arrangement for an automative power transmission, according to the present invention, which FIG. 1 also illustrate a detector circuit associated with a selector position detector to form the first embodiment of the selector position detector arrangement in combination.

Referring now to the drawings, particularly to FIG. 1, the preferred embodiment of a selector position detector 10 has a pivotal arm 11 which is pivotable about a pivot axis 12. The pivotal arm 11 is associated with a manually operable selector lever (not shown) of the transmission for being simultaneously moved to a position which corresponds to the selected operational range or mode in which the selector lever has been set. The pivotal arm 11 carries an electrically conductive contactor member 14 which is located adjacent the free end of the arm.

As seen from FIG. 1, the pivotal arm 11 is pivotally mounted on a detector body 16. The detector body 16 may be made of electrically non-conductive material and generally formed into a fan-shaped configuration. The mid-portion 18 of the detector body 16 is stepped down relative to the circumferential portion 20 which includes arc portion 20a. The pivotal arm 11 is pivoted at the pivot of the fan-shaped detector body 16 so that the contactor member 14 may move along the arc portion 20a.

Adjacent the inner edge of the arc portion 20a, a pair of arc-shaped electrodes 22 and 24 are provided within the stepped-down mid-portion 18. The electrode 22 serves as a primary electrode and made of a material having a high impedance. Therefore, the primary electrode 22 serves as a resistor. One end 26 of the primary electrode 22 is connected to a constant voltage source 28 via a lead 30 to be applied a given voltage, e.g. +5V of constant voltage. The other end 32 of the primary electrode 22 is connected to the ground via a lead 34.

The electrode 24 serves as a secondary electrode and made of a material having low impedance to serve as a conductor. The curvature of the secondary electrode 24 is selected so that the secondary electrode extends parallel to the foregoing primary electrode 22 in spaced apart relationship with a predetermined width of gap. The secondary electrode 24 has one end 36 connected an analog-to-digital (A/D) converter 38 via a lead 40.

The contactor member 14 of the pivotal arm 11 is so oriented as to bridge the primary and secondary electrodes 22 and 24. Therefore, the primary and secondary electrodes 22 and 24 are connected to each other by means of the contactor member 14. Therefore, the electric current from the constant voltage source flows through a section 42 which is located upstream side of the contacting point 44, at which the contactor member 14 contacts with the primary electrode, the contactor member, the secondary electrode 24 and the lead 40 to the A/D converter 38. As will be appreciated, since the primary electrode 22 has relatively high impedance and the second electrode 24 has relatively low impedance, the output voltage of the selector position detector 10, appearing on the lead 40 is variable depending upon the position of the contactor member 14. As set forth above, since the contactor member 14 is fixedly mounted on the pivotal arm 11 which is variable of the angular position depending upon the selector position, the output voltage at the lead 40 represents the position of the selector lever.

The A/D converter 38 receives the output voltage of the selector position detector 10 via the lead 40. The A/D converter 38 converts the output voltage of the selector position detector 10 into a digital signal having a value corresponding to the output voltage of the selector position detector. The A/D converter 38 is connected to a discriminator circuit 46.

The discriminator circuit 46 is set reference values respectively representative of the selector positions. Namely, assuming the automotive power transmission has six ranges, i.e. P, R, N, D, 2 and 1, six reference values may be set in the discriminator circuit 46. The discriminator circuit 46 compares the digital signal value with the reference values in order to discriminate the selector position on the basis of the digital signal. The discriminator circuit 46 thus output a selector position indicative signal.

In the shown embodiment, the contactor member 14 is positioned at the leftmost position when the P of the automatic transmission is selected through the selector lever. The impedances of the primary and secondary electrodes 22 and 24 are so selected that the output voltage to appear on the lead 40 at this P position of the contactor member 14 is substantially 0V. On the other hand, the contactor member 14 is positioned at the rightmost position when the first drive position, namely 1 is selected. At this 1 position, the output voltage of the selector position detector 10 becomes substantially 5V. Therefore, while the selector lever is shifted from the P to 1 across the R position, N position, D position and 2 position in order, the output voltage of the selector position detector 10 increases from 0V to 5V.

It will be appreciated that the reference values respectively represent digital signal values when the selector lever is positioned at P, R, N, D, 2 and 1. Therefore, when the digital signal value matches the P indicative reference value, the discriminator 46 outputs P indicative selector position indicative signal. Similarly, by comparing the digital signal value with respective reference values, the selector position can be exactly detected. In addition, since the shown embodiment can discriminate selector positions simply based on the digital signal values, the number of ranges to detect can be changed by variably setting the reference values and number of the reference values. Namely, in case of five range, i.e. P, R, N, D and 2, automatic transmission, five reference values respectively representative of P, R, N, D and 2 range positions of the selector lever will be set in the discriminator circuit 46. Similarly, in case of seven range, e.g. P, R, N, D, 0/D, 2, 1, seven reference values will be set in the discriminator circuit 46.

Therefore, the shown embodiment of the selector position detector 10 is applicable for any automatic transmissions regardless of the number of shift positions by variably setting of the reference values.

Figure 2:
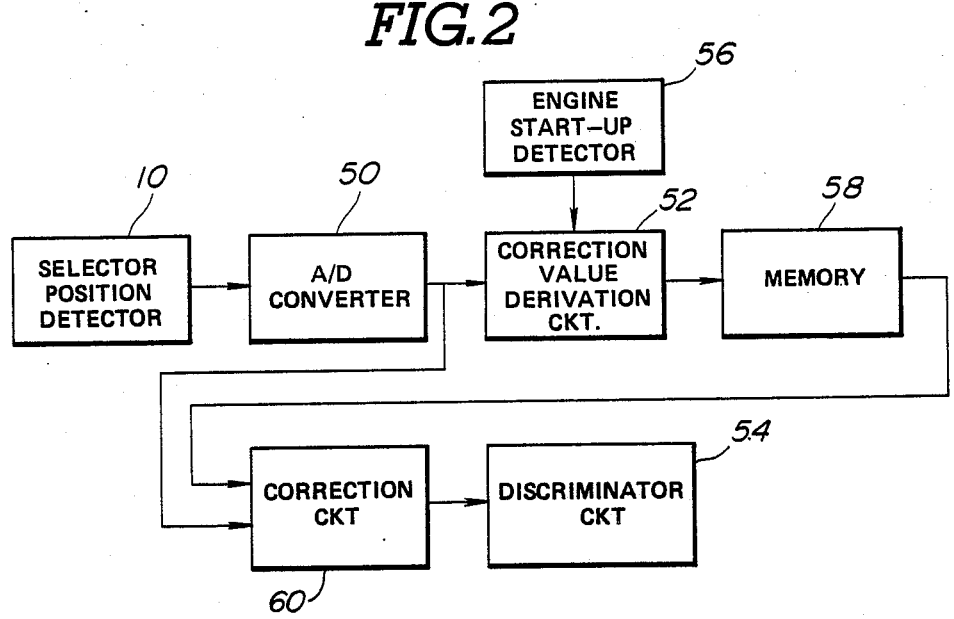
FIG. 2 is a block diagram of the second embodiment of an automatic transmission selector position detector arrangement according to the invention.

FIG. 2 schematically shows the second embodiment of a selector position detector arrangement according to the invention. In this embodiment, the construction of the selector position detector is substantially the same as that employed in the former embodiment. Therefore, detailed discussion about the construction of the selector position detector will be neglected by identifying respective corresponding feature to the same reference numerals.

The second embodiment of the selector position detector arrangement features modification of the reference values based on the digital signal value upon engine start-up. Namely, as is well known, an automatic transmission vehicle is associated with an inhibitor switch for inhibiting an engine cranking operation unless the automatic transmission is set in P or N. Therefore, when the engine is started up, the automatic transmission must be set at P or N. Therefore, by comparing the digital signal value with the preset P or N representative reference value, an error value therebetween can be obtained. Based on the error value, a correction value for correcting respective reference values is derived.

In the arrangement of FIG. 2, the selector position detector 10 is connected to an A/D converter 50. Similarly to the A/D converter 38, the A/D converter 50 converts the analog selector position indicative output signal of the selector position detector 10. The A/D converter 50 is connected to a correction value derivation circuit 52. The correction value derivation circuit 52 is also connected to a discriminator circuit 54 which discriminates the selector position by comparing the value of the digital signal output from the A/D converter 50, to receive therefrom the P and N representative reference signal set therein. The correction value derivation circuit 52 is, in turn, connected to an engine start-up detector 56. The engine start-up detector 56 detects the engine cranking condition to output an engine start-up condition indicative signal. The correction value derivation circuit 52 is triggered by the engine start-up condition indicative signal to compare the digital signal value received from the A/D converter 50 with the already set P and N representative reference values read from the discriminator circuit 54.

In the process of derivation of the correction value A, discrimination is made as to whether the engine start-up is initiated at the P or N of the automatic transmission. Based on the result of discrimination, the digital signal value is compared with one of P representative reference value or N representative reference value corresponding to the selected transmission control position. A difference between the digital signal value and the read P representative or N representative reference value is derived as an error value. Based on this error value, the correction value A is derived.

The correction value derivation circuit 52 feeds the correction value indicative signal to a memory 58 to store the derived correction value A. The memory 58 is connected to a correction circuit 60 which is connected to the A/D converter 50 to receive therefrom the digital signal. The correction circuit 60 reads out the stored correction value A from the memory 58 to modify the digital signal value and feeds a corrected digital signal to the discriminator circuit 54. Based on the corrected digital signal from the correction circuit 60, the discriminator circuit 54 discriminates the selector position to output the selector position indicative signal.

Figure 3:
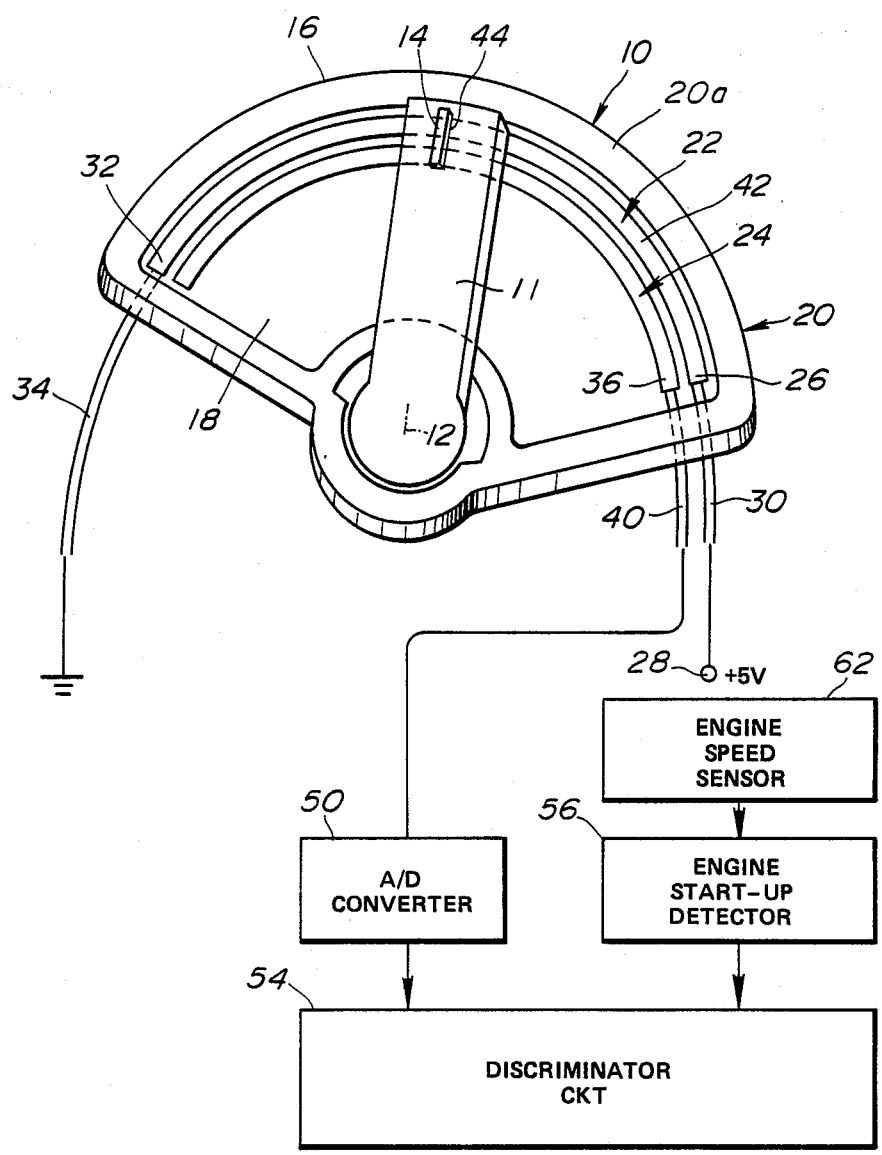
FIG. 3 is a fragmentary illustration of the second embodiment of the selector position detector arrangement, in which is also illustrated a detector circuit associated with a selector position detector to form the second embodiment of the selector position detector arrangement in combination.

Practical construction and the operation of the second embodiment of the selector position detector arrangement will be described in detail with reference to FIGS. 3 to 5. In the practical construction of the second embodiment of the selector position detector arrangement, the discriminator circuit 54 comprises a microprocessor including a memory having a memory block serving as the memory 58 for storing the correction value.

Similarly to the foregoing first embodiment, the selector position detector 10 is connected to the A/D converter 50. The A/D converter 50 feeds the digital signal having a value corresponding to the selector position indicative output signal voltage of the selector position detector 10 to the discriminator circuit 54.

In the embodiment shown, an engine speed sensor 62 is provided. The engine speed sensor 62 monitors the engine revolution speed and outputs an engine speed indicative signal. The engine speed indicative signal is fed to the engine start-up detector 56 The engine start-up detector 56 detects an increase from zero or a predetermined value of the engine speed to output a HIGH level engine start-up condition indicative signal. The engine start-up condition indicative signal is maintained at a LOW level while the engine speed is zero or lower than a predetermined value representative of a very low engine speed and at HIGH level while the engine speed is higher than zero or higher than or equal to a predetermined value. The engine start-up condition indicative signal is transmitted to the discriminator circuit 54. Therefore, the leading edge of the engine start-up condition indicative signal will serve to indicate the engine start-up condition. The discriminator circuit 54 is normally triggered every predetermined interval to compare the digital signal modified with the correction value A, with the reference values to discriminate the selector position to produce a selector position indicative signal. On the other hand, the discriminator circuit 54 is responsive to the engine start-up indicative signal from the engine start-up detector 56 to derive the correction value A on the basis of the selector position indicative digital signal from the A/D converter 50.

It should be appreciated that though the embodiment shown employs the engine start-up detector 56 for detecting the engine cranking condition for initiating the correction value deriving operation, it would be possible to detect the engine cranking condition in various other manners. For example, the engine start-up can be detected by directly monitoring the engine speed indicative signal value. In the alternative, the engine start-up condition can be detected by detecting operation of the starter motor. Therefore, the manner of detection of the engine start-up condition in the embodiment shown should be regarded as a mere example for implementing the invention.

The process of derivation of the correction value A and discrimination of the selector position will be explained with reference to FIGS. 4 and 5.

Figure 4:
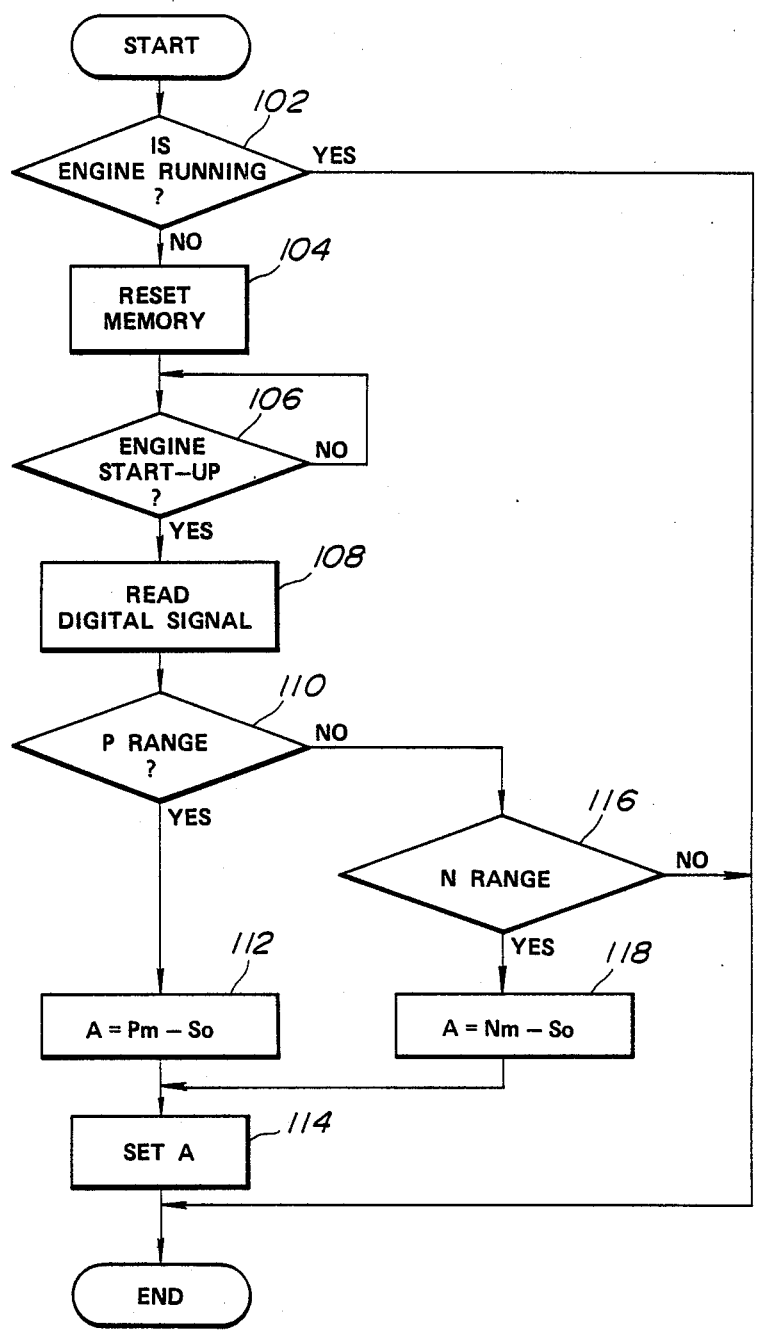
FIG. 4 is a flowchart of a correction value derivation program executed in the second embodiment of the selector position detector arrangement of FIG. 3, which correction value derivation program is to be initially executed upon engine start-up for deriving a correction value.

FIG. 4 shows a process in deriving the correction value in response to engine start-up operation. Since this routine is executed by the discriminator circuit 54 only upon engine start-up, a check is performed as to whether the engine is running or not at the very first step 102 immediately after start of execution. In practice, the check at step 102 is performed by checking the output of the engine start-up detector 56. Namely, the engine start-up condition indicative signal is checked for determine whether the engine is running or not. When the engine start-up condition indicative signal is HIGH level, the process goes to END. On the other hand, when the engine start-up condition indicative signal is LOW, as checked at the step 102, the correction value A stored in the memory 58 is cleared at a step 104.

At a step 106, the engine start-up condition indicative signal level is again checked. This step 106 may be repeated for a predetermined period or until the engine start-up operation is initiated. In case, the predetermined period of time expires, the process goes to END. On the other hand, when the leading edge of the HIGH level engine start-up condition indicative signal is detected at the step 106, the digital signal of the A/D converter 50 is read at a step 108. Based on the read digital signal value, discrimination is made at a step 110 whether the selector level is in the P position or not. When the selector lever is in the P position as checked at the step 110, an error value is obtained between the preset P representative reference value Pm and the read digital signal value $S_0$ at a step 112. This error value (Pm $-S_0$) serves as the correction value A. The correction value A derived at the step 112 is set in the memory 58, at a step 114.

On the other hand, if the selector level position is not in the P position as checked at the step 110, a check is performed at a step 116 with regard to the N position. If the selector level is in the N range, an error value between the preset N representative reference value Nm and the read digital signal value $S_0$ is obtained at a step 118. This error value (Nm $-S_0$) serves as the correction value A. The correction value A derived at the step 118 is set in the memory 58, at a step 114. When the selector lever position as checked at the step 116 is not in the N position, the process goes to END.

Figure 6:
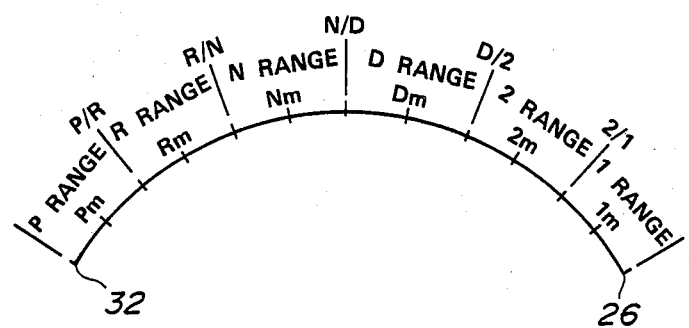
FIGS. 6 and 7 are explanatory illustration of showing relationship between the selector position and the digital signal values.
Figure 7:
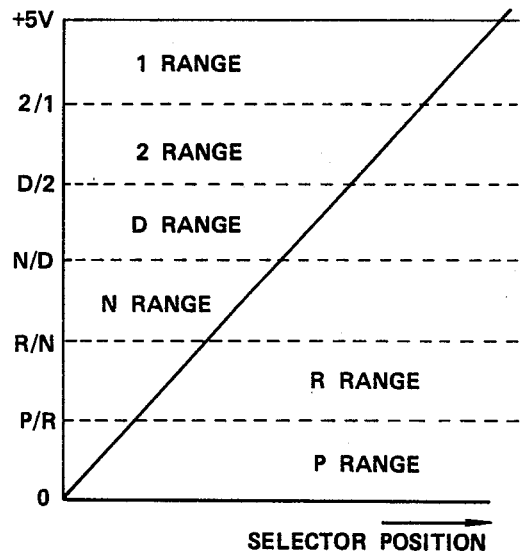

In practice, discrimination of the selector lever position at the steps 110 and 116 is performed by checking the digital signal value $S_0$. Namely, predetermined digital signal value ranges are set about the P representative reference value Pm and the N representative reference value Nm. These predetermined digital signal value ranges represent the possible digital signal values when the selector level is in the P position and the N position, in view of errors in assembling of the automatic transmissions and/or due to secular variations. Similarly, for each transmission operational range, digital signal value ranges will be defined. Namely, as explanatorily illustrated in FIGS. 6 and 7, the P position indicative value range, R position indicative value range, N position indicative value range, D position indicative value range, 2 position indicative value range and 1 position indicative value range are defined in the case of the six shift position transmission. Each of the P position indicative value range, R position indicative value range, N position indicative value range, D position indicative value range, 2 position indicative value range and 1 position indicative value range is defined about the reference value Pm, Rm, Nm, Dm, 2m and 1m as the center value thereof. Therefore, between respectively adjacent value ranges, P/R criterion, R/N criterion, N/D criterion, D/2 criterion and 2/1 criterion are set.

Figure 5:
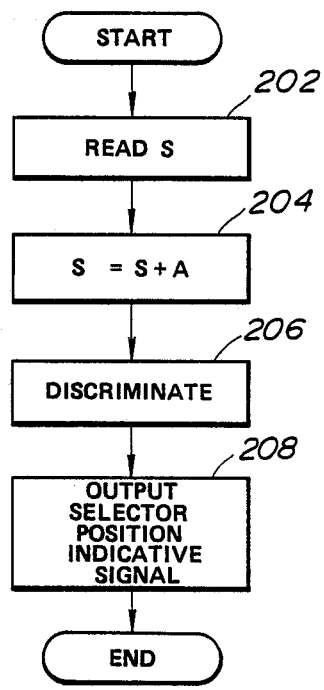
FIG. 5 is a flowchart of a selector position detecting program to be executed in the second embodiment of the selector position detector arrangement of FIG. 3, for detecting the automatic transmission selector position and outputting a selector position indicative signal.

FIG. 5 shows a process of discrimination of the selector position. The routine shown is triggered every predetermined period. In order to trigger the routine of FIG. 5, the discriminator circuit 54 may be provided with an internal clock for measuring an elapsed time to produce a trigger signal for triggering this routine every predetermined period.

At the initial stage of execution of the routine of FIG. 5, the digital signal value S from the A/D converter 50 is read at a step 202. The read digital signal value S is modified by adding the correction value A to derive a modified digital signal value $S_A$, at a step 204. The modified digital signal value $S_A$ is compared with respective values of the P/R criterion, R/N criterion, N/D criterion, D/2 criterion and 2/1 for discriminating the selector position, at a step 206. Based on the result of discrimination at the step 206, the selector position indicative signal is output at a step 208.

It should be appreciated that though the embodiment shown modifies the digital signal value from the A/D converter 50, it may be possible to modify the reference values or criteria to be compared with the digital signal.

Figure 8:
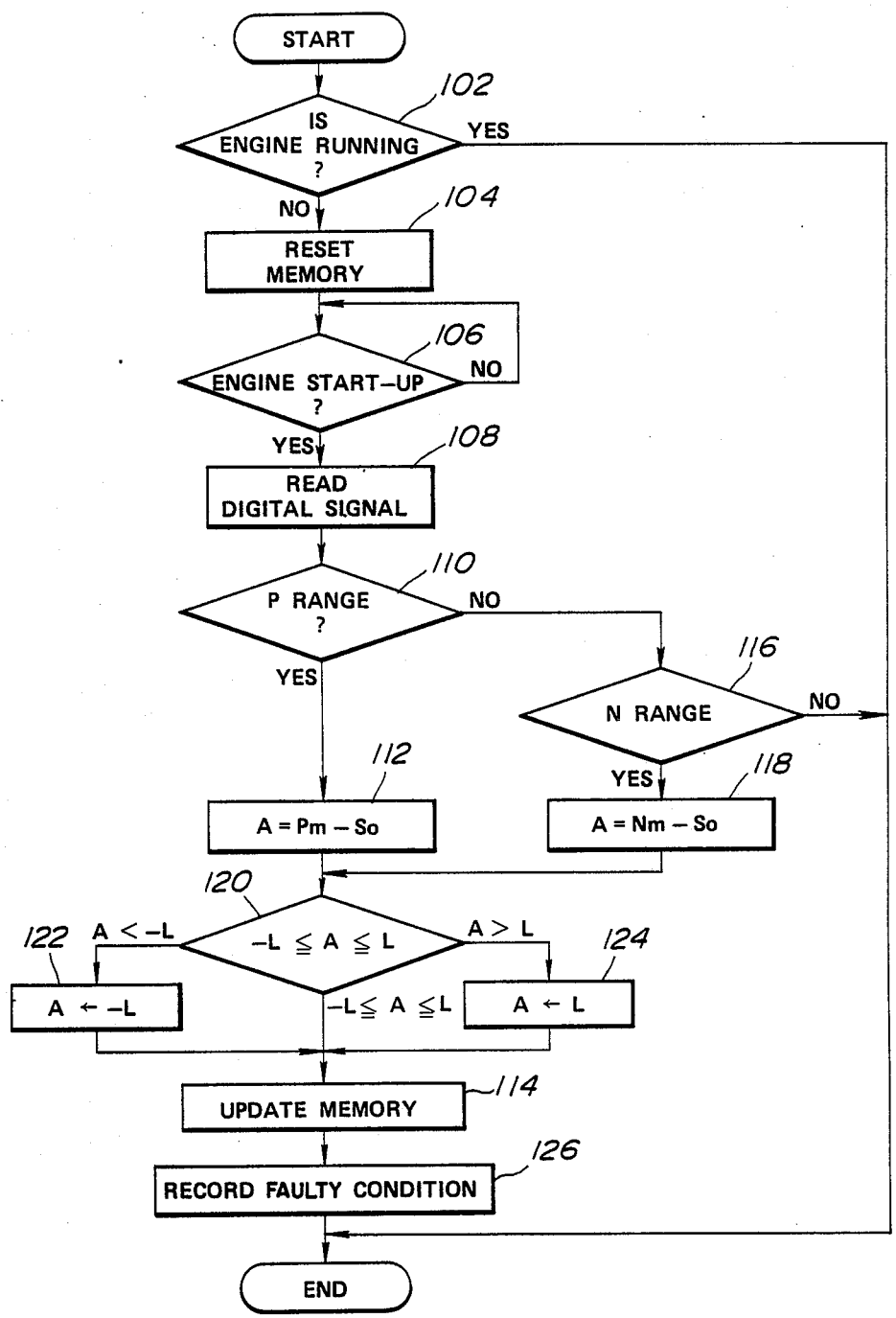
FIG. 8 is a flowchart of a modification of the selector position detecting program of FIG. 5.

FIG. 8 shows a modified routine of the correction value derivation routine of FIG. 4. In the modified routine of FIG. 8, the process steps 102 through 118 are identical to that discussed with respect to FIG. 4. The modified routine features the limitation of the correction value A within a predetermined normal value range. Namely, as long as the selector lever is accurately assembled with the automatic transmission, the selector position indicative digital signal value must be within a certain value range. In other words, when the digital signal value is abnormally great or small in view of the selector lever position, i.e. P position or N position, it is possible that the selector position detector fails or the selector lever is mis-assembled.

At a step 120, the correction value A is compared with a preset upper criterion $+L$ and a lower criterion $-L$. The upper criterion $+L$ represents the greatest correction value of the normal correction value range. On the other hand, the lower criterion $-L$ represents the smallest correction value of the normal correction value range. When the correction value A is smaller than or equal to the upper criterion $+L$ and greater than or equal to the lower criterion $-L$, the correction value A as derived at the step 112 or 118 is set in the memory 58 at the step 114. On the other hand, when the correction value A is greater than the upper criterion $+L$, the correction value A is limited to the upper criterion $+L$ at a step 122. When the correction value A is smaller than the lower criterion $-L$, the correction value A is limited to the lower criterion $-L$, at a step 124.

After setting the correction value A at the step 114, a faulty condition is recorded when the correction value A is output of the normal correction value range, at a step 126.

Figure 9:
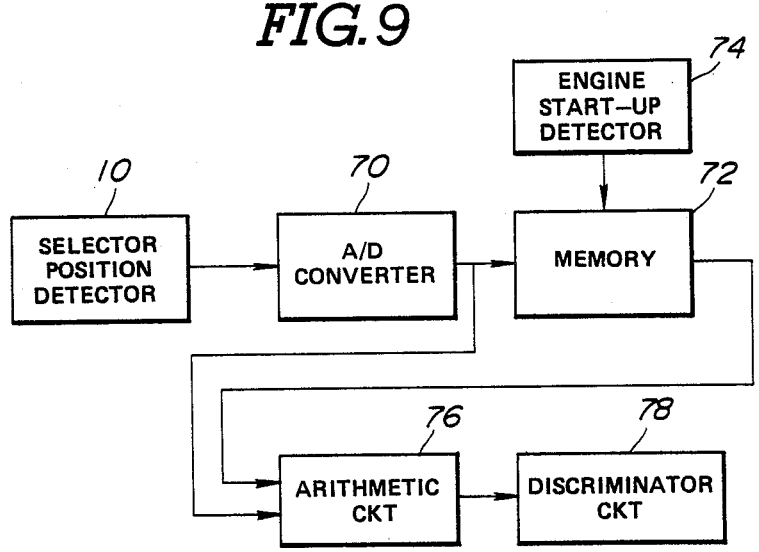
FIG. 9 is a block diagram of the third embodiment of an automatic transmission selector position detector arrangement according to the invention.

FIG. 9 shows the third embodiment of the selector position detector arrangement according to the invention. In this embodiment, the selector position detector 10 is constructed in substantially identical construction to that of the foregoing first and second embodiments. The selector position detector 10 outputs the selector position indicative analog signal to an A/D converter 70. The AID converter 70 is connected to a memory means 72 which is, in turn, connected to an engine start-up detector 74. The engine start-up condition monitors the engine operating condition and detects the engine start-up or cranking condition to produce the engine start-up condition indicative signal.

The memory means 72 is responsive to the engine start-up condition indicative signal to update the storing value with the digital signal value from the A/D converter 70. The value stored in the memory means 72 serves as an initial selector position indicative value $S_0$. Since the engine can be started up at the P or N of the selector position, the initial selector position indicative value $S_0$ represents the digital signal value at the P position or N position of the selector lever.

The A/D converter 70 is also connected to an arithmetic circuit 76 which is also connected to the memory means 72 to receive therefrom the stored value. The arithmetic circuit 76 derives a difference between the initial selector position indicative value $S_0$ and the instantaneous digital signal value S. A discriminator circuit 78 receives the difference value D and the initial selector position indicative value $S_0$. On the basis of the initial selector position indicative value $S_0$, the discriminator circuit 78 discriminates whether the initial selector position indicative value represents the P position of the selector or the N position of the selector. Based on this, the discriminator discriminates the selector position in terms of the difference value D.

A practical selector position detecting operation to be carried out by the third embodiment of the selector position detector arrangement will be discussed herebelow with reference to FIGS. 10 and 11.

It should be appreciated the practical construction of the hardware the third embodiment of the selector position detector arrangement may be identical to that of the foregoing second embodiment.

Figure 10:
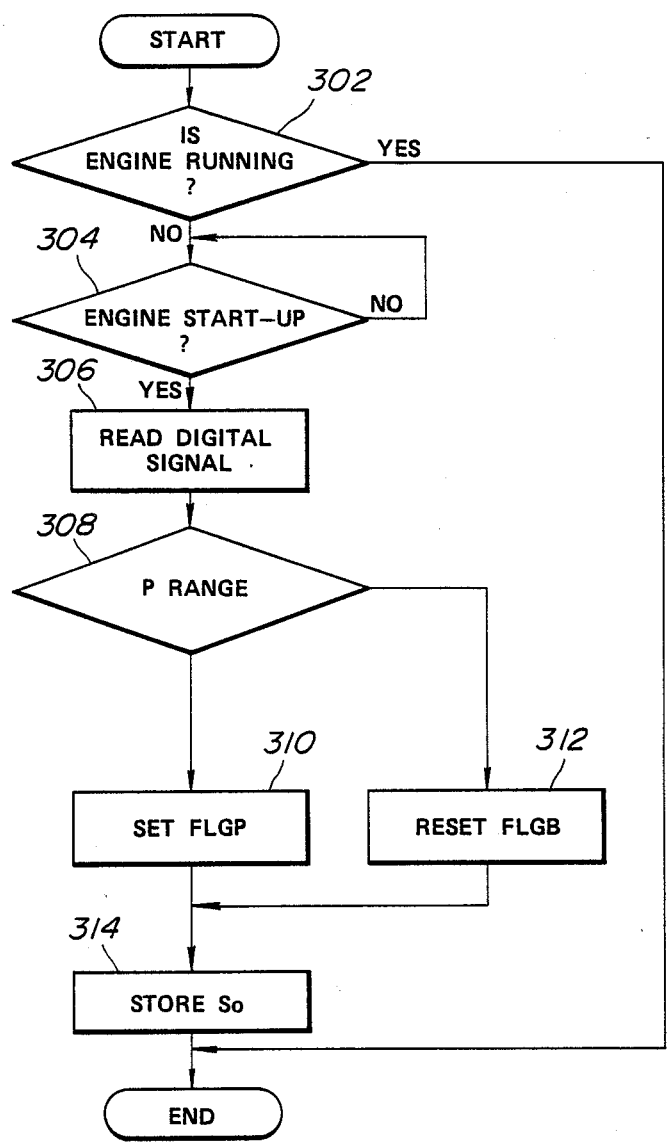
FIG. 10 is a flowchart of a correction value derivation program executed in the third embodiment of the selector position detector arrangement of FIG. 7, which correction value derivation program is to be initially executed upon engine start-up for deriving a correction value.

FIG. 10 shows a process for setting a digital signal value representative of the P position of the selector lever. Similarly to the routine of FIG. 4, the routine of FIG. 10 is triggered upon engine start-up. A check is performed as to whether the engine is running or not at the very first step 302 immediately after start execution. In practice, the check at the step 302 is performed by checking the output of the engine start-up detector 56. Namely, the engine start-up condition indicative signal is checked for determining whether the engine is running or not. When the engine start-up condition indicative signal is at a HIGH level, the process goes to the END step. On the other hand, when the engine start-up condition indicative signal is held at a LOW level as checked at the step 102, the engine start-up condition indicative signal level is again checked at a step 304. This step 304 may be repeated for a predetermined period or until the engine start-up operation is initiated. In case, the predetermined period of time overs, expires the process goes END. On the other hand, when the leading edge of the HIGH level engine start-up condition indicative signal is detected at the step 304, the digital signal of the A/D converter 50 is read at a step 306.

Based on the read digital signal value, discrimination is made at a step 308 as the whether the selector level is in the P position or not. When the selector lever is in the P position as checked at the step 308, a P indicative flag FLGP is set at a step 310. On the other hand, if the selector level position is not in the P position as checked at the step 308, the P indicative flag FLGP is reset at a step 312. After setting or resetting the P indicative flag FLGP, the digital signal value $S_0$ as read at the step 306 is set in the memory 58 at a step 314.

Figure 11:
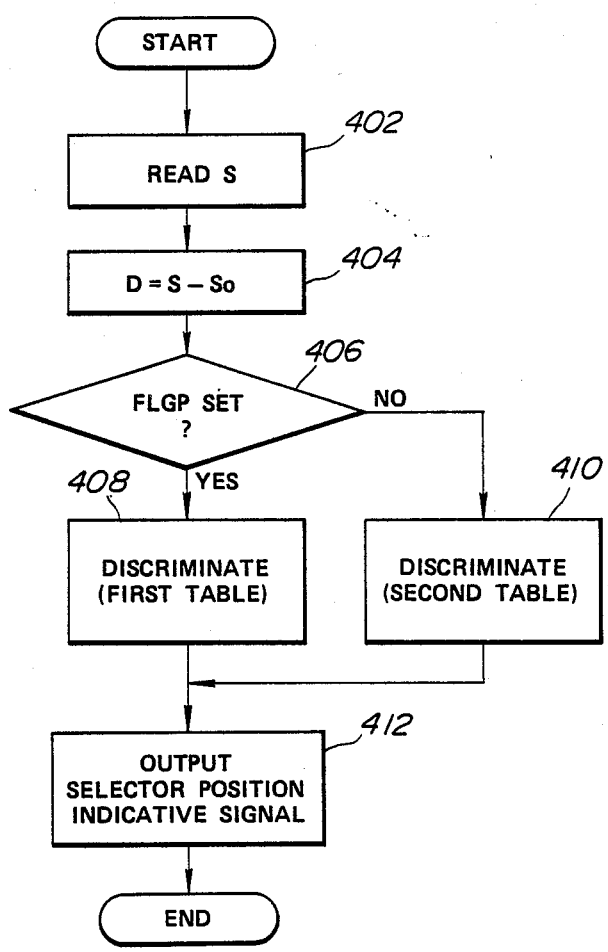
FIG. 11 is a flowchart of a selector position detecting program to be executed in the third embodiment of the selector position detector arrangement of FIG. 7, for detecting the automatic transmission selector.

FIG. 11 is a routine for discriminating the selector position. Similarly to the routine of FIG. 5, the routine of FIG. 11 is executed every predetermined period. Therefore, the shown routine is triggered with a given constant interval. Immediately after starting execution, the digital signal value S is read at a step 402. A difference D between the stored value $S_0$ in the memory and the digital signal value S as read at the step 402, is derived at a step 404.

At a step 406, the P indicative flag FLGP is checked. When the P indicative flag FLGP is set, a first table which is set in the discriminator and established with respect to the P indicative value is accessed at a step 408. The first table contains difference values at respective selector positions with respect to the P indicative value. The selector position is thus discriminated utilizing the first table in terms of the difference derived at the step 404. On the other hand, when the P indicative flag FLGP is not set, a second table which is set in the discriminator and established with respect to the N indicative value is accessed at a step 410. The second table contains difference values at respective selector positions with respect to the N indicative value. The selector position is thus discriminated utilizing the second table in terms of the difference derived at the step 404.

After the step 408 or 410, the selector position indicative signal is output at a step 412.

As will be appreciated herefrom, the selector position detector can accurately detect the selector position even when there in error in assembling the selector lever in the automatic transmission or error due to secular variation. Furthermore, since the selector position detector can vary the number of shift positions of the selector lever simply by changing the setting of the reference value or table, it may be applicable for detecting the selector position of any number of shift positions of automatic transmission. Furthermore, in the latter two embodiments, since correction for the selector position discriminating data, e.g. the selector position indicative digital signal value and a difference to an initial value on the basis of the initial selector position indicative signal value upon engine start-up, error caused by play of the selector lever and or by secular variation can be successfully compensated.

It should be appreciated that, though the embodiment shown for the transmission gear position detector arrangement detects the P and N positions, the detector may be able to detect other selector positions, such as D position, 2 position and so forth. Precise detection of the drive gear range of selector position may be useful in controlling driving torque in an automotive engine and/or in the power train. Therefore, the invention should not be understood to be limited to the specific embodiment discussed hereabove, which detects only P and N positions, but to include all of the possible embodiments including detection of any desired drive gear positions.

Therefore, the invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A selector position detector arrangement for an automotive automatic transmission, for detecting a position of a selector lever which is arranged to be manually shifted over a plurality of predetermined positions for selecting one of a plurality of gear positions of said automatic transmission, comprising:
 a detector means, mechanically associated with said selector lever of said automatic transmission, for producing a variable level analog signal which has a signal level variable over a plurality of ranges depending upon the position of said selector lever, and each of said ranges being representative of the selected one of said gear positions of said selector lever;
 an analog-to-digital converter circuit receiving said analog signal for converting said analog signal into a digital signal having a digital value corresponding to the level of said analog signal; and
 discriminator means for deriving selector position discriminating data on the basis of said digital signal and a known reference level at known selector positions, for comparing said discriminating data with a plurality of reference values, each of which is set to represent a border between adjacent ranges of signal levels and representative of criterion in discriminating signal level ranges corresponding to the selector lever positions for discriminating the selector position and for producing a selector position indicative signal.

2. A selector position detector arrangement as set forth in claim 1, wherein said detector means comprises a movable member movable according to select position of said selector lever, a first and second electrodes, and conductive member carried by said movable member and bridging between said first and second electrodes, said first electrode being connected to a constant level source at one end and to the ground at the other end, said second electrode having an output terminal at one end, the impedance of said first and second electrodes being so selected to as to linearly vary the level according to the selector position.

3. A selector position detector arrangement as set forth in claim 1, which further comprises a correction value deriving means responsive to engine start-up for deriving a correction value on the basis of the digital signal at engine start-up and a preset value corresponding to parking position and neutral position.

4. A selector position detector arrangement as set forth in claim 3, wherein said correction value derivation means discriminates transmission selector position between said parking position and neutral position and deriving a difference between said digital signal and said preset value as said correction value, and said discriminator means derives said discriminating data on the basis of the digital signal value and said correction value.

5. A selector position detector arrangement as set forth in claim 4, which further comprises a correction value limiting means for limiting said correction value within a predetermined value range.

6. A selector position detector arrangement as set fort in claim 5, wherein said limiting means limits said correction value at upper or a lower limit of said predetermined value range.

7. A selector position detector arrangement as set forth in claim 1, which further comprises an initial value setting means responsive to engine start-up for setting a digital value at engine start-up as an initial value, and said discriminator means calculates a difference between instantaneous digital signal value and said initial value so as to discriminate the selector position based on said difference.

8. A selector position detector arrangement as set forth in claim 7, wherein said discriminator means discriminate selector position upon engine start-up between parking position and neutral position, and select reference values to be compared with said difference value corresponding to the selector position upon engine start-up.

9. A selector position detector arrangement for an automatic transmission, for detecting a position of a selector lever which is arranged to be manually shifted over a plurality of predetermined positions for selecting one of a plurality of gear positions of said automatic transmission, comprising:
- a detector means, mechanically associated with said selector lever of said automatic transmission, for producing a variable level analog signal which has a signal level variable over a plurality of ranges depending upon the position of said selector lever, and each of said ranges being representative of a selected one of said positions of said selector lever;
- a converter circuit receiving said analog signal and converting said received analog signal into a digital signal having a digital value variable depending upon the level of said analog signal;
- a correction value deriving means responsive to engine start-up for deriving a correction value on the basis of the digital signal at engine startup and a preset value corresponding to a parking position and a neutral position of said selector lever; and
- a discriminator means for deriving selector position discriminating data on the basis of said digital signal and said correction value, for comparing said discriminating data with a plurality of reference values, each of which is set to represent a border between adjacent ranges of signal levels and representative of criterion in discriminated signal level ranges corresponding to the selector lever positions for discriminating the selector position and for producing a selector position indicative signal.

10. A selector position detector arrangement as set forth in claim 9, wherein said correction value derivation means discriminates transmission selector position between said parking position and neutral position and deriving a difference between said digital signal and said preset value as said correction value, and said discriminator means derives said discriminating data on the basis of the digital signal value and said correction value.

11. A selector position detector arrangement as set forth in claim 10, which further comprises a correction value limiting means for limiting said correction value within a predetermined value range.

12. A selector position detector arrangement as set forth in claim 11, wherein said limiting means limits said correction value at upper or a lower limit of said predetermined value range.

13. A selector position detector arrangement as set forth in claim 9, wherein said detector means comprises a movable member movable according to select position of said selector lever, a first and second electrodes, and conductive member carried by said movable member and bridging between said first and second electrodes, said first electrode being connected to a constant level source at one end and to the ground at the other end, said second electrode having an output terminal at one end, the impedance of said first and second electrodes being so selected to as to linearly vary the level according to the selector position.

14. A selector position detector arrangement for an automotive automatic transmission, for detecting a position of a selector lever which is arranged to be manually shifted over a plurality of predetermined positions for selecting one of a plurality of gear positions of said automatic transmission, comprising:
- a detector means, mechanically associated with said selector lever of said automatic transmission, for producing a variable level analog signal which has a signal level variable over a plurality of ranges depending upon the position of said selector lever, and each of said ranges being representative of a selected one of said positions of said selector lever;
- a converter circuit receiving said analog signal and converting said received analog signal into a digital signal having a digital value variable depending upon the level of said analog signal;
- an initial value setting means responsive to engine start-up for setting a digital value at engine start-up as an initial value, said initial value setting means detecting an initial position of said selector lever shifted at one of a park or a neutral position, deriving a deviation between the instantaneous digital signal value output from said converter circuit upon engine start-up and a known value with respect of said initial position of said selector lever for setting said initial value; and
- a discriminator means for deriving a selector position discriminating data on the basis of said digital signal and said initial value, for comparing said discriminating data with a plurality of reference values, each of which is set to represent a border between adjacent ranges of signal levels and representative of criterion in discriminating signal level ranges corresponding to the selector lever positions for discriminating the selector position and for producing a selector position indicative signal.

15. A selector position detector arrangement as set forth in claim 14, wherein said discriminator means discriminate selector position upon engine start-up between parking position and nuetral position, and select reference values to be compared with said difference value corresponding to the selector position upon engine start-up.

16. A selector position detector arrangement as set forth in claim 14, wherein said detector means comprises a movable member movable according to select position of said selector lever, a first and second electrodes, and conductive member carried by said movable member and bridging between said first and second electrodes, said first electrode being connected to a constant level source at one end and to the ground at the other end, said second electrode having an output terminal at one end, the impedance of said first and second electrodes being so selected to as to linearly vary the level according to the selector position.

* * * * *